US010008119B2

(12) United States Patent
Willborn et al.

(10) Patent No.: US 10,008,119 B2
(45) Date of Patent: Jun. 26, 2018

(54) SLOW MOVING OBJECT ROAD WARNING SYSTEM

(71) Applicant: Slow Ride LLC, Oregon, WI (US)

(72) Inventors: Bradley R. Willborn, Belmont, WI (US); Erling M. Olson, Oregon, WI (US)

(73) Assignee: Slow Ride LLC, Oregon, WI (US)

( * ) Notice: Subject to any disclaimer, the term of this patent is extended or adjusted under 35 U.S.C. 154(b) by 0 days. days.

(21) Appl. No.: 15/586,518

(22) Filed: May 4, 2017

(65) Prior Publication Data

US 2017/0323569 A1 Nov. 9, 2017

Related U.S. Application Data

(60) Provisional application No. 62/333,351, filed on May 9, 2016.

(51) Int. Cl.

| | |
|---|---|
| ***H04Q 7/00*** | (2006.01) |
| ***G08B 1/08*** | (2006.01) |
| ***G08G 1/16*** | (2006.01) |
| ***G08G 1/09*** | (2006.01) |
| ***G08G 1/052*** | (2006.01) |

(52) U.S. Cl.

CPC ............. *G08G 1/166* (2013.01); *G08G 1/052* (2013.01); *G08G 1/09* (2013.01)

(58) Field of Classification Search

CPC ................. G08G 1/095; G08G 1/0955; G08G 1/096716; G08G 1/042; G08G 1/052; G08G 1/164; G08G 1/08; G08G 1/02; G08G 1/0104; G01S 13/931; B60Q 1/525; B60Q 9/00; G08B 25/016; G08B 25/10; G08B 25/14; B60R 16/0236; B60R 1/12; G06F 7/00; G09F 9/33; B61L 1/10

USPC ........ 340/907, 908, 903, 436, 539.11, 539.1, 340/439, 425.5, 905, 525, 933, 4, 41, 340/944; 701/301, 117

See application file for complete search history.

(56) References Cited

U.S. PATENT DOCUMENTS

| | | | | |
|---|---|---|---|---|
| 5,771,484 | A | 6/1998 | Tognazzini | |
| 6,411,896 | B1 | 6/2002 | Shuman et al. | |
| 6,731,202 | B1 | 5/2004 | Klaus | |
| 6,864,784 | B1 * | 3/2005 | Loeb | G08G 1/096716 180/171 |
| 7,079,024 | B2 * | 7/2006 | Alarcon | G08B 5/006 340/539.11 |
| 8,912,921 | B2 | 12/2014 | Reavell | |
| 8,922,391 | B2 | 12/2014 | Rubin et al. | |
| 2001/0011957 | A1 * | 8/2001 | Mitchell | G08G 1/052 340/936 |
| 2002/0175831 | A1 * | 11/2002 | Bergan | G08G 1/081 340/908.1 |

(Continued)

*Primary Examiner* — Firmin Backer
*Assistant Examiner* — Munear Akki
(74) *Attorney, Agent, or Firm* — Bell & Manning, LLC

(57) ABSTRACT

A computing device identifies a slow moving object and activates an alert signal a predetermined period of time when the slow moving object is identified. A sensor measurement is received from a sensor to compute a speed of travel of a moving object. When the computed speed is below a predefined speed threshold, an alert signal of an alert signal device mounted adjacent to the sensor is activated and the alert signal is deactivated when a predetermined period of time relative to a time of activation of the alert signal expires.

20 Claims, 7 Drawing Sheets

(56) References Cited

U.S. PATENT DOCUMENTS

| | | | | |
|---|---|---|---|---|
| 2006/0139156 | A1* | 6/2006 | Beverly | G08G 1/02 340/432 |
| 2007/0085703 | A1* | 4/2007 | Clark | B61L 1/10 340/907 |
| 2007/0290886 | A1* | 12/2007 | Stam | B60Q 9/00 340/907 |
| 2009/0256698 | A1 | 10/2009 | Bonilla | |
| 2011/0153116 | A1* | 6/2011 | Bedingfield, Sr. | B60K 31/0058 701/1 |
| 2011/0199231 | A1* | 8/2011 | Loiselle | G09F 9/33 340/907 |
| 2013/0113618 | A1 | 5/2013 | Flanagan et al. | |
| 2013/0127638 | A1 | 5/2013 | Harrison | |
| 2015/0161888 | A1* | 6/2015 | Kim | G08G 1/052 340/936 |
| 2015/0194053 | A1* | 7/2015 | Jensen | B60Q 1/442 340/944 |

* cited by examiner

SLOW MOVING OBJECT ROAD WARNING SYSTEM

CROSS-REFERENCE TO RELATED APPLICATIONS

The present application claims the benefit of 35 U.S.C. § 119(e) to U.S. Provisional Patent Application No. 62/333,351 filed on May 9, 2016, the entire contents of which are hereby incorporated by reference.

BACKGROUND

There have been a number of accidents including many fatalities that involve slow moving objects on rural roads that have rated speeds of 45 to 55 miles per hour (mph). Most of these roads are narrow, winding roads with no shoulders and very limited visibility as a result of the terrain.

Initially, it was thought that it was just agricultural equipment, but as it turns out there are many objects that are slow moving that might have frequent stops and starts on rural roads. These objects include: agricultural equipment, a school bus, a delivery truck, a garbage truck, a horse and buggy, a snow plow, a bicycle, a pedestrian (walking/running), deer or other animals, etc. All of these objects either travel at slower than rated speed or spend a high percentage of their time starting and stopping.

Even the best drivers that are paying 100% attention to the road have issues when encountering these objects. If there is a 50 mph difference between two vehicles—the gap is closed at a rate of 73 feet per second (fps). Even if the driver is lucky enough to have an entire football field between objects (300 feet) that gap is covered in just over 4 seconds.

Many new vehicles will soon be designed with warning systems to aid drivers in avoiding some of these collisions. However, even these systems cannot see over hills or around corners.

Previous attempts to reduce the accident rates include slow moving vehicle triangles, tail lights, and road signs that inform travelers, for example, of school bus stops. The slow moving vehicle triangles and the tail lights travel with the vehicle. Therefore, they are not seen until several seconds before impact resulting in insufficient time for a fast moving driver to react. Stationary road signs are always there, but it is very easy to ignore them because nothing makes them interactive.

SUMMARY

In an example embodiment, a computer-readable medium is provided having stored thereon computer-readable instructions that when executed by a computing device, cause the computing device to identify a slow moving object and activate an alert signal a predetermined period of time when the slow moving object is identified. A sensor measurement is received from a sensor. A speed of travel of a moving object is computed. When the computed speed is below a predefined speed threshold, an alert signal of an alert signal device mounted adjacent to the sensor is activated, and the alert signal is deactivated when a predetermined period of time relative to a time of activation of the alert signal expires.

In another example embodiment, a system is provided. The system includes, but is not limited to, a sensor mounted to a post, a processor, and a computer-readable medium operably coupled to the processor. The computer-readable medium has instructions stored thereon that, when executed by the processor, cause the system to identify a slow moving object and activate an alert signal a predetermined period of time when the slow moving object is identified.

In yet another example embodiment, a method of identifying a slow-moving object on a road and activating an alert signal a predetermined period of time when the slow moving object is identified is provided.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

DETAILED DESCRIPTION

Figure 1:
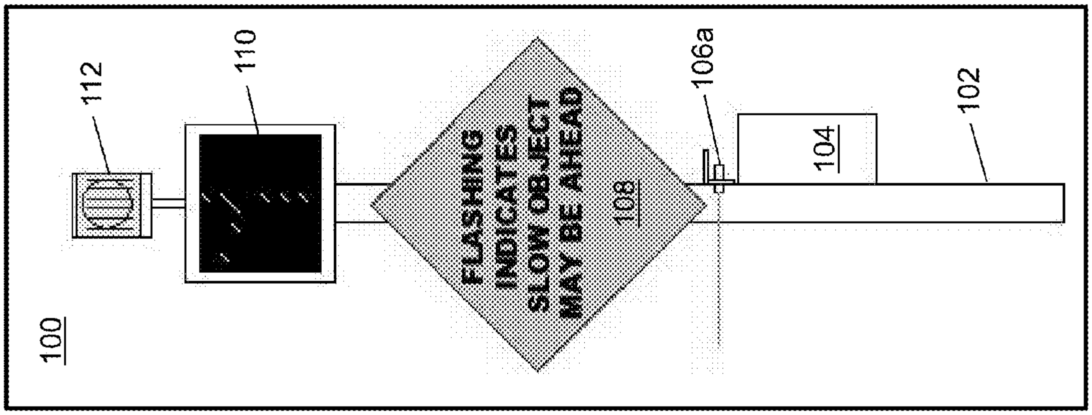
FIG. 1 depicts a front view of a warning device in accordance with an illustrative embodiment.
Figure 2:
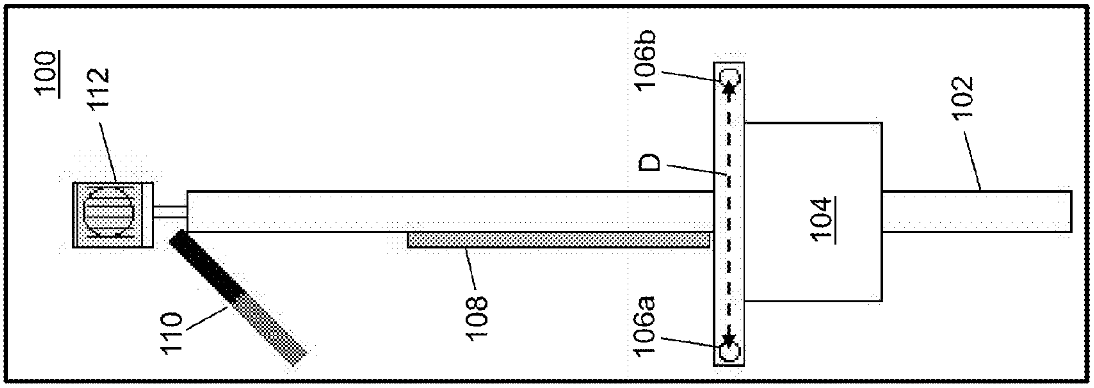
FIG. 2 depicts a side view of a warning device in accordance with an illustrative embodiment.

Referring to FIG. 1, a front view of a warning device 100 is shown in accordance with an illustrative embodiment. Referring to FIG. 2, a side view of warning device 100 is shown in accordance with an illustrative embodiment. Warning device 100 may include a pole 102, a controller cabinet 104, a first sensor 106*a*, a second sensor 106*b*, a warning sign 108, a power source 110, and a light 112. Fewer, different, and/or additional components may be incorporated into warning device 100. For example, warning sign 108 and/or light 112 may be mounted to one or more separate poles or other devices in proximity to the remaining components of warning device 100.

Figure 3:
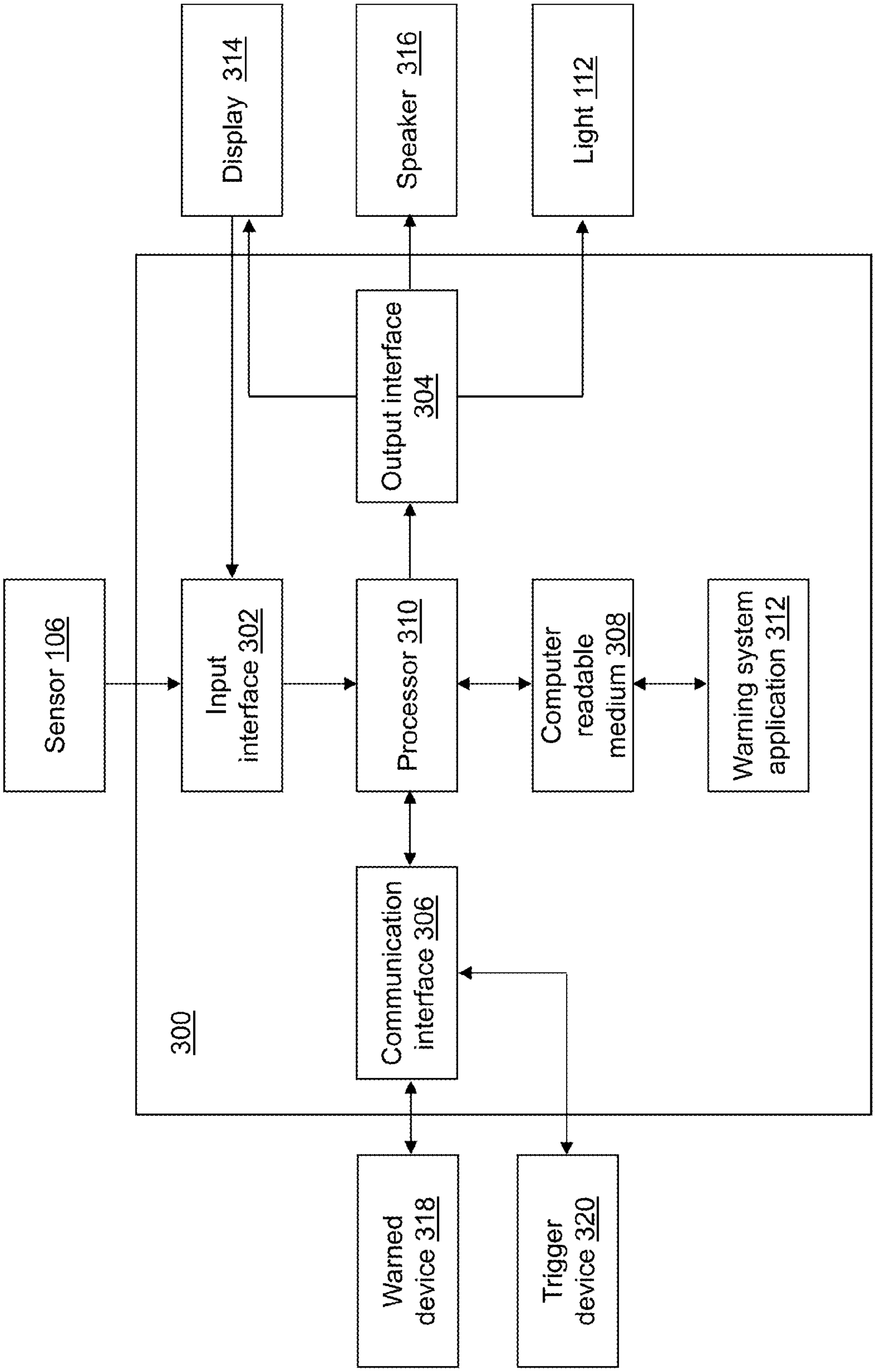
FIG. 3 depicts a block diagram of a controller of the warning device of FIGS. 1 and 2 in accordance with an illustrative embodiment.

Referring to FIG. 3, a controller 300 of warning device 100 is shown in accordance with an illustrative embodiment. Controller 300 may be housed within controller cabinet 104 for protection from the environment. Controller 300 may include an input interface 302, an output interface 304, a communication interface 306, a computer-readable medium 308, a processor 310, and a warning system application 312. Fewer, different, and/or additional components may be incorporated into controller 300.

Input interface 302 provides an interface for receiving information into controller 300 as understood by those skilled in the art. Input interface 302 may interface with various input technologies including, but not limited to, a keyboard, a mouse, a microphone, a display 314, a track ball, a keypad, one or more buttons, etc. to allow a user to enter information into controller 300 or to make selections presented in a user interface displayed on display 314. Input interface 302 further may interface with sensor 106 to receive sensor measurements. For example, sensor 106 may include first sensor 106*a* and second sensor 106*b*. The same interface may support both input interface 302 and output interface 304. For example, display 314 comprising a touch screen provides user input and presents output to the user. Controller 300 may have one or more input interfaces that use the same or a different input interface technology. The input interface technology further may be accessible by controller 300 through communication interface 306.

Output interface 304 provides an interface for outputting information from controller 300. For example, output interface 304 may interface with various output technologies including, but not limited to, display 314, a speaker 316, light 112, etc. Controller 300 may have one or more output interfaces that use the same or a different output interface technology. The output interface technology further may be accessible by controller 300 through communication interface 306.

Communication interface 306 provides an interface for receiving and transmitting data between devices using various protocols, transmission technologies, and media as understood by those skilled in the art. Communication interface 306 may support communication using various transmission media that may be wired and/or wireless. Controller 300 may have one or more communication interfaces that use the same or a different communication interface technology. For example, controller 300 may support communication using an Ethernet port, a Bluetooth antenna, a WiFi antenna, a telephone jack, a USB port, etc. Data and messages may be transferred between controller 300 and a warned device 318 and/or a trigger device 320 using communication interface 306.

Computer-readable medium 308 is an electronic holding place or storage for information so the information can be accessed by processor 310 as understood by those skilled in the art. Computer-readable medium 308 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. Controller 300 may have one or more computer-readable media that use the same or a different memory media technology. For example, computer-readable medium 308 may include different types of computer-readable media that may be organized hierarchically to provide efficient access to the data stored therein as understood by a person of skill in the art. As an example, a cache may be implemented in a smaller, faster memory that stores copies of data from the most frequently/recently accessed main memory locations to reduce an access latency. Controller 300 also may have one or more drives that support the loading of a memory media such as a CD, DVD, an external hard drive, etc. One or more external hard drives further may be connected to controller 300 using communication interface 306.

Processor 310 executes instructions as understood by those skilled in the art. The instructions may be carried out by a special purpose computer, logic circuits, or hardware circuits. Processor 310 may be implemented in hardware and/or firmware. Processor 310 executes an instruction, meaning it performs/controls the operations called for by that instruction. The term "execution" is the process of running an application or the carrying out of the operation called for by an instruction. The instructions may be written using one or more programming language, scripting language, assembly language, etc. Processor 310 operably couples with input interface 302, with output interface 304, with communication interface 306, and with computer-readable medium 308 to receive, to send, and to process information. Processor 310 may retrieve a set of instructions from a permanent memory device and copy the instructions in an executable form to a temporary memory device that is generally some form of RAM. Controller 300 may include a plurality of processors that use the same or a different processing technology.

Warning system application 312 performs operations associated with activating and deactivating an alert signal. Some or all of the operations described herein may be embodied in warning system application 312. Referring to the example embodiment of FIG. 3, warning system application 312 is implemented in software (comprised of computer-readable and/or computer-executable instructions) stored in computer-readable medium 308 and accessible by processor 310 for execution of the instructions that embody the operations of warning system application 312. Warning system application 312 may be written using one or more programming languages, assembly languages, scripting languages, etc.

Warning system application 312 may be implemented as a Web application. For example, warning system application 312 may be configured to receive hypertext transport protocol (HTTP) requests and to send HTTP responses. The HTTP responses may include web pages such as hypertext markup language documents and linked objects generated in response to the HTTP requests. Each web page may be identified by a uniform resource locator that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java applet, an extensible markup language file, or any other type of file supported by HTTP.

Figure 4:
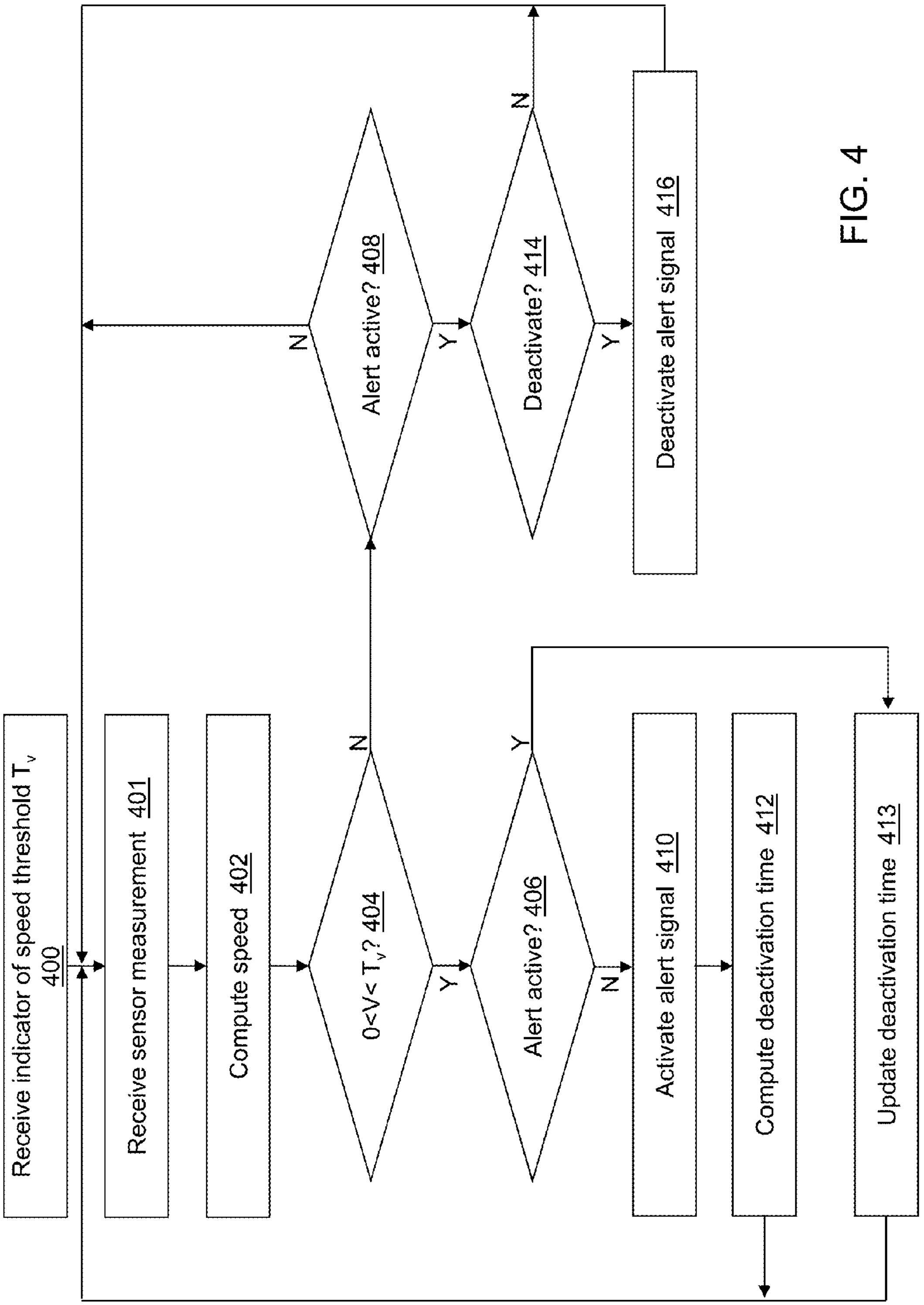
FIG. 4 depicts a flow diagram illustrating example operations performed by a warning system application of the controller of FIG. 3 in accordance with an illustrative embodiment.

Referring to FIG. 4, example operations associated with warning system application 312 are described. Additional, fewer, or different operations may be performed depending on the embodiment. The order of presentation of the operations of FIG. 4 is not intended to be limiting. Although some of the operational flows are presented in sequence, the various operations may be performed in various repetitions, concurrently (in parallel, for example, using threads), and/or in other orders than those that are illustrated. For example, as described above, a user may execute warning system application 312, which causes presentation of a first user interface window, which may include a plurality of menus and selectors such as drop down menus, buttons, text boxes, hyperlinks, etc. associated with warning system application 312 as understood by a person of skill in the art. An indicator may indicate one or more user selections from a user interface, one or more data entries into a data field of the user interface, one or more data items read from computer-readable medium 308 or otherwise defined with one or more default values, etc. that are received as an input by warning system application 312.

In an operation 400, an indicator is received that indicates a value for a speed threshold $T_v$. The first indicator may be received by warning system application 312 after selection from a user interface window or after entry by a user into a user interface window. In an alternative embodiment, the value for speed threshold $T_v$ may not be selectable. For example, a default value may be used that is stored in computer-readable medium 308. The value for speed threshold $T_v$ indicates the speed below which an alert signal is triggered. For example, the value for speed threshold $T_v$ may be half a rated speed of a road adjacent to warning device 100 and on which objects are traveling at various speeds. The road may be any type of single or multi-lane road including a paved road, a dirt or gravel path, etc.

In an operation 401, a sensor measurement is received from sensor 106. For example, sensor 106 may include a photoelectric sensor, an ultrasonic sensor, an infrared motion sensor, a radar sensor, etc. that generates a measurement that can be used to compute a speed of an object passing through a sensing volume spanned by sensor 106 or otherwise determine when a passing object is traveling slowly in comparison to other passing objects. For example, sensor 106 may transmit a signal at one or more frequencies of light and detect a reflection of the transmitted signal that is reflected by the passing object. As another example, sensor 106 may generate a beam at one or more frequencies of light and detect when the beam is obstructed by the passing object. As yet another example, sensor 106 may transmit a signal at one or more frequencies of sound and detect a reflection of the transmitted signal that is reflected by the passing object. Different sensor technologies may be desirable in different operating conditions and locations. The passing object may be any type of vehicle (i.e., car, truck, bus, tractor or other agricultural equipment, postal delivery truck, garbage truck, horse and buggy, snow plow, bicycle), pedestrian (walking/running), a deer, a horse, or other animal, etc.

In an operation 402, a speed of the passing object is computed using the received sensor measurement(s). In an illustrative embodiment where sensor 106 includes first sensor 106*a* and second sensor 106*b* that are both photoelectric sensors, each of first sensor 106*a* and second sensor 106*b* measure a time of a sensor activation by the passing object as the object passes in succession through each beam. For example, first sensor 106*a* measures a sensor activation at $T_1$, and second sensor 106*b* measures a sensor activation at $T_2$. A time difference $\Delta_t$ is computed as $\Delta_t=|T_2-T_1|$ for a bidirectional warning device 100. A time difference $\Delta_t$ is computed as $\Delta_t=T_2-T_1$ for a unidirectional warning device 100. First sensor 106*a* and second sensor 106*b* are mounted a known distance D (shown referring to FIG. 2) apart. The speed V is computed as $V=D/\Delta_t$.

Activation of sensor 106 for a minimum amount of time may be used to prevent false nuisance trips from small objects such as insects or rain. Once sensor 106 has been activated, it may not be retriggered for a minimum dwell time.

In an operation 404, a determination is made concerning whether or not $0<V\leq T_v$. When $0<V\leq T_v$, processing continues in an operation 406. When $V<0$ or $V>T_v$, processing continues in an operation 408. For a unidirectional warning device 100, a negative $\Delta_t$ indicates the passing object is traveling in the opposite direction being monitored so no alert is activated and processing continues in operation 408 to ignore the negative velocity determination. Of course, the test further may be based on the negative value of $\Delta_t$.

In an alternative embodiment, a time difference threshold $\Delta_{tT}$ may be computed or input in a manner similar to that described for $T_v$ and used as the threshold for comparison in operation 404. For example, $\Delta_{tT}=D/T_v$ and when $\Delta_t\geq\Delta_{tT}$, processing continues in operation 406; when $\Delta_t<\Delta_{tT}$, processing continues in operation 408.

In operation 406, a determination is made concerning whether or not an alert is currently active. When an alert is currently active, processing continues in an operation 413 to update a deactivation time. When an alert is not currently active, processing continues in operation 410.

In operation 410, an alert signal is triggered. For example, light 112 is turned on. Light 112 may be configured to flash and may be configured to radiate different colors, such as yellow or red. As another example, a lettering of warning sign 108 may be lit to form display 314. As another example, speaker 316 may be activated to play a warning message. As another example, a warning message may be sent to warned device 318 using communication interface 306. Any warned device 318 within a reception distance based on the type of communication interface 306 may receive the warning message.

In an operation 412, a deactivation time may be computed for the alert signal, and processing continues in an operation 401 to process a next received sensor measurement. For example, an alert may be triggered to remain on a predetermined period of time. The predetermined period of time may be an input or a default value as described with reference to operation 400 for speed threshold $T_v$. As another option, the predetermined period of time may be determined based on the computed speed V of the passing object. The slower the computed speed V of the passing object, the longer the predetermined period of time to allow a sufficient distance before a next passing object encounters the passing object that triggered the alert or to reach another warning device 100.

In an operation 413, the deactivation time may be updated for the alert signal, and processing continues in an operation 401 to process a next received sensor measurement. For example, a new deactivation time may be computed based on another passing object triggering a measurement by sensor 106 in a manner similar to operation 412. In an illustrative embodiment, the deactivation time is not updated when a shorter deactivation time is computed.

In operation 408, a determination is made concerning whether or not an alert is currently active. When an alert is currently active, processing continues in an operation 414. When an alert is not currently active, processing continues in operation 401 to process a next received sensor measurement.

In operation 414, a determination is made concerning whether or not the currently active alert should be deactivated. For example, the determination may be true if a current time exceeds the predetermined period of time, and false if a current time does not exceed the predetermined period of time. When the currently active alert should be deactivated, processing continues in an operation 416. When the currently active alert should not be deactivated, processing continues in operation 401 to process a next received sensor measurement.

In operation 416, the alert signal is turned off, and processing continues in operation 401 to process a next received sensor measurement. For example, light 112, display 314, and/or speaker 316 are turned off.

Figure 5:
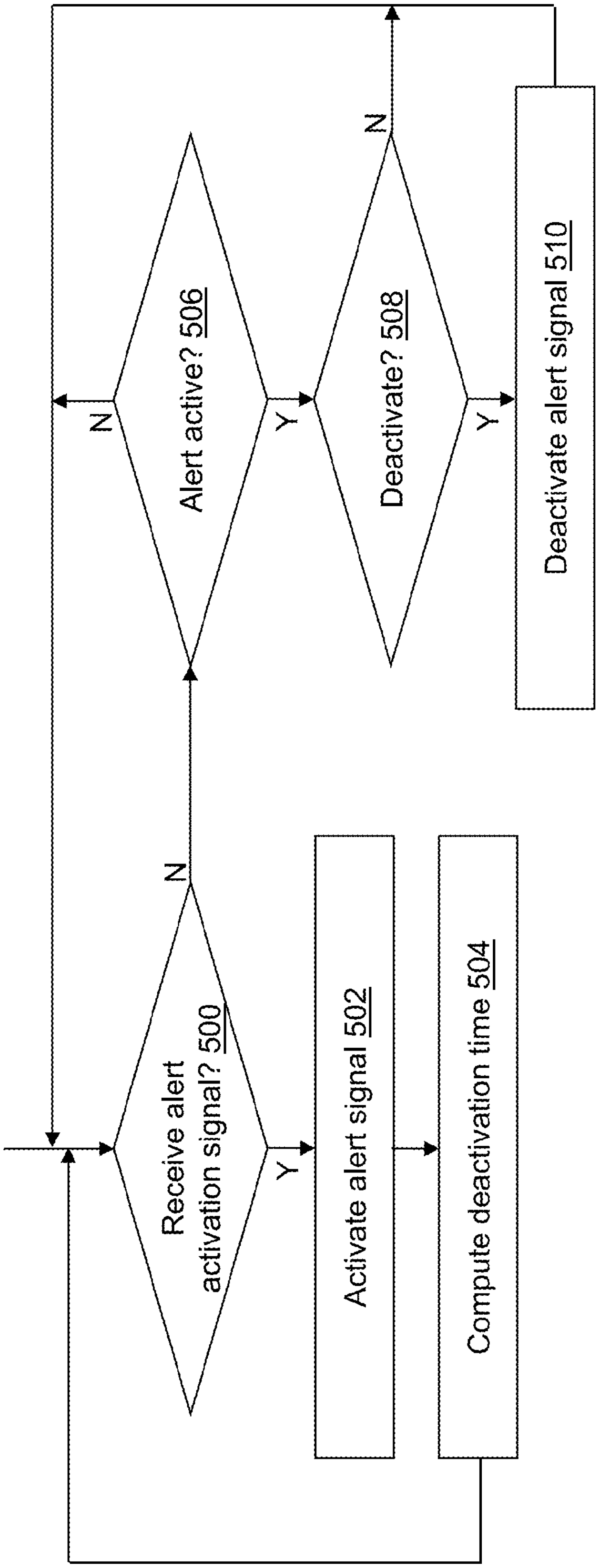
FIG. 5 depicts a flow diagram illustrating additional example operations performed by the warning system application of the controller of FIG. 3 in accordance with an illustrative embodiment.

Referring to FIG. 5, additional example operations associated with warning system application 312 are described. Additional, fewer, or different operations may be performed depending on the embodiment. The order of presentation of the operations of FIG. 5 is not intended to be limiting.

In an operation 500, a determination is made concerning whether or not an alert activation signal is received. When an alert activation signal is received, processing continues in an operation 502. When an alert activation signal is not received, processing continues in an operation 506.

The alert activation signal may be sent by trigger device 320 to controller 300. For example, the alert activation signal may be received by controller 300 using communication interface 306. Any trigger device 320 within a transmission distance based on the type of communication interface 306 may send the alert activation signal. The alert activation signal may be sent using an infrared signal, a magnetic coupling, a radio frequency, etc.

Trigger device 320 may be used on vehicles that are making frequent stops (school buses, postal trucks, garbage trucks, delivery trucks) or on emergency vehicles to trigger the alert when approaching a stop. Trigger device 320 further may be carried by a bicyclist or pedestrian to trigger the alert when approaching warning device 100.

Similar to operation 410, in operation 502, an alert signal is triggered. A different type of alert signal may be separately triggered by the alert activation signal to distinguish a triggered alert from a generated alert. For example, warning device 100 may include a second light 112*a* that is turned on.

Similar to operation 412, in an operation 504, a deactivation time may be computed for the alert signal, and processing continues in an operation 500 to process a next received alert activation signal. For example, the alert may be triggered to remain on a second predetermined period of time when an alert activation signal is received. The second predetermined period of time and the predetermined period of time may be the same values. In an illustrative embodiment, the second predetermined period of time may be based on a time value or time indicator included in the alert activation signal.

In operation 506, a determination is made concerning whether or not an alert is currently active. When an alert is currently active, processing continues in an operation 508. When an alert is not currently active, processing continues in operation 500 to process a next received alert activation signal.

In operation 508, a determination is made concerning whether or not the currently active alert should be deactivated. For example, the determination may be true if a current time exceeds the second predetermined period of time, and false if a current time does not exceed the second predetermined period of time. When the currently active alert should be deactivated, processing continues in an operation 510. When the currently active alert should not be deactivated, processing continues in operation 500 to process a next received alert activation signal.

Similar to operation 416, in operation 510, the alert signal is turned off, and processing continues in operation 500 to process a next received alert activation signal.

Figure 6:
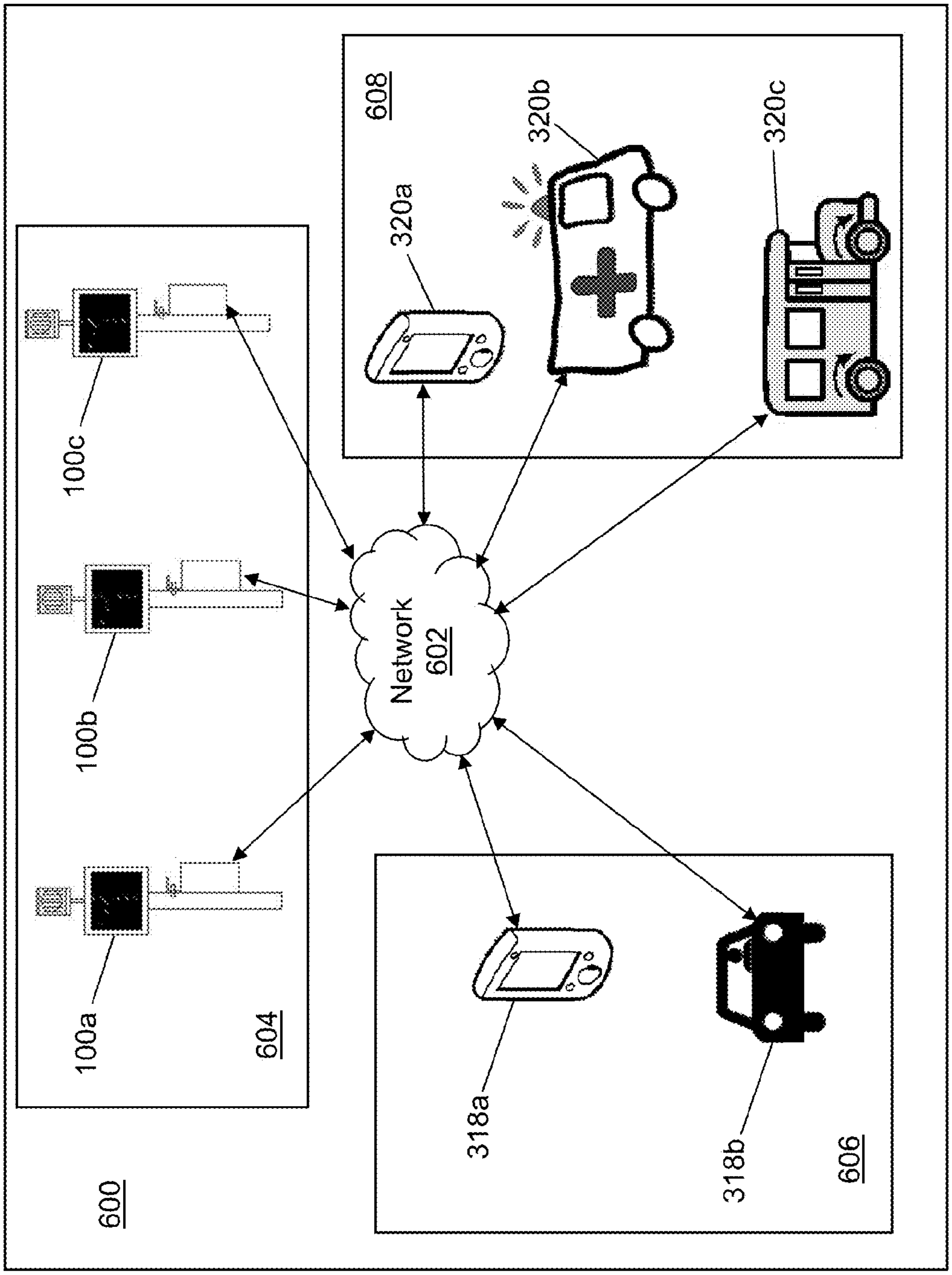
FIG. 6 depicts a block diagram of a warning system in accordance with an illustrative embodiment.

Referring to FIG. 6, a block diagram of a warning system 600 is shown in accordance with an illustrative embodiment. In an illustrative embodiment, warning system 600 may include a network 602, a plurality of warning devices 604, a plurality of warned devices 606, and a plurality of trigger devices 608.

Network 602 may include one or more networks of the same or different types. Network 602 can be any type of wired and/or wireless public or private network including a cellular network, a local area network, a wide area network such as the Internet or the World Wide Web, etc. Network 602 further may comprise sub-networks and consist of any number of communication devices.

For illustration, the plurality of warning devices 604 include a first warning device 100*a*, a second warning device 100*b*, and a third warning device 100*c* though warning system 600 may include any number of warning devices. The plurality of warning devices 604 may be distributed geographically over a region and located at various points along one or more roads. The locations may be selected based on a terrain of the respective location, a desired distance between warning devices determined based on typical travel speeds, etc. Each warning device 100 of the plurality of warning devices 604 may be connected to communicate through network 602 using communication interface 306.

For illustration, the plurality of warned devices 606 include a first warned device 318*a* and a second warned device 318*b* though warning system 600 may include any number of warned devices. The plurality of warned devices 606 may include computers of any form factor such as a smart phone, a laptop, a personal digital assistant, an integrated messaging device, a tablet computer, etc. that communicate with one or more of the plurality of warning devices 604 to receive the warning message through network 602 using various transmission media that may be wired and/or wireless as understood by those skilled in the art. Each warned device 318 of the plurality of warned devices 606 include a display and/or a speaker that present the received warning message to a user. Any warned device 318 may be integrated with a vehicle computer system that presents the warning message.

For illustration, the plurality of trigger devices 608 include a first trigger device 320*a*, a second trigger device 320*b*, a third trigger device 320 though warning system 600 may include any number of trigger devices. The plurality of trigger devices 608 may include computers of any form factor such as a smart phone, a laptop, a personal digital assistant, an integrated messaging device, a tablet computer, etc. that communicate with one or more of the plurality of warning devices 604 to send the alert activation signal through network 602 using various transmission media that may be wired and/or wireless as understood by those skilled in the art. Any trigger device 320 may be integrated with a vehicle computer system that sends the alert activation signal. For example, a user may press a button that automatically sends the alert activation signal to any warning device 100 within range of the signal.

Referring again to FIGS. 1 and 2, controller cabinet 104, first sensor 106*a*, second sensor 106*b*, power source 110, and/or light 112 are mounted to pole 102 that may be formed of a variety of materials such as wood, metal, plastic, etc. Pole 102 further may have a variety of heights, sizes, and shapes and may be mounted to other objects or inserted partially into the ground to position warning device 100 to measure a speed of the passing object. For example, pole 102 may be new or part of a current road sign, guard rail, light pole, etc. to which controller cabinet 104, first sensor 106*a*, second sensor 106*b*, power source 110, and/or light 112 are mounted using any attachment mechanism.

The plurality of warning devices 604 work individually though they can be placed in groups to cover a concentrated or larger area. For example, warning device 100 may be located at an end of a driveway or field access location.

Power source 110 provides power to warning device 100 including controller 300. For example, power source 110 may include a solar panel, a power grid connection, a wind turbine, a battery, etc.

As an example, warning system 600 may be used in rural areas where vehicles and other objects are traveling at drastically different rates of speed. For example, agricultural equipment and horse and buggies often travel at a rate between 8 and 10 mph. As they pass warning device 100, their slow rate of travel is detected and light 112 begins to flash. Light 112 may remain flashing for 15 minutes after they pass—by that time they may have passed the next warning device 100 to trigger another light 112 to flash. Vehicles traveling at the rated speed coming from behind are warned that a slow moving vehicle may be in front of them.

Warning device 100 can be stationary and/or portable. The stationary application is for locations that continuously have vehicles that travel at different speeds. A portable device could be used for seasonal or temporary situations where slow objects may be encountered during different events or seasonal applications.

Figure 7:
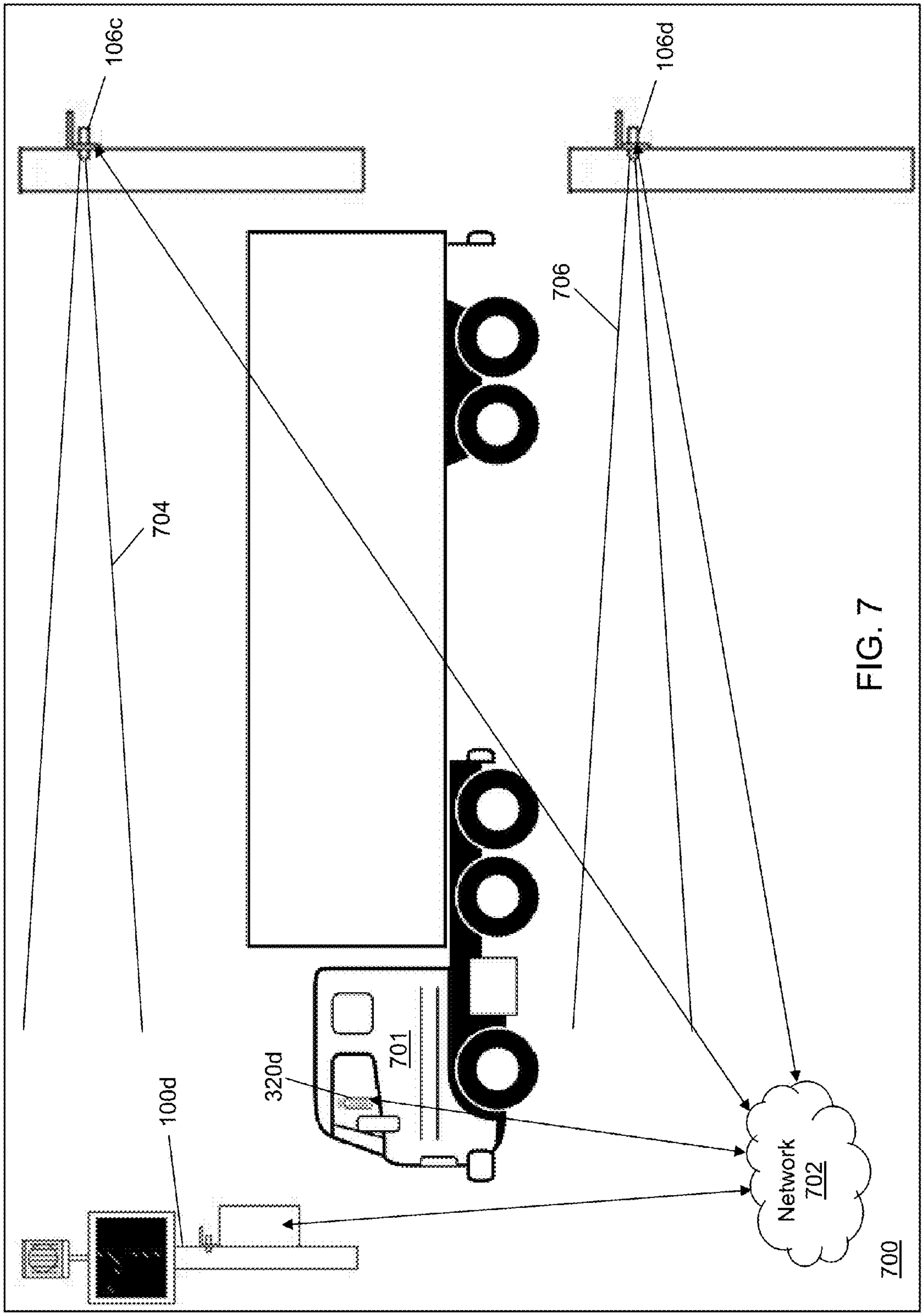
FIG. 7 depicts a block diagram of a second warning system in accordance with an illustrative embodiment.

Referring to FIG. 7, a block diagram of a second warning system 700 is shown in accordance with an illustrative embodiment. In an illustrative embodiment, second warning system 700 may include a vehicle 701, a network 702, a fourth warning device **100*d*, a fourth trigger device 320*d*, a third sensor 106*c*, and a fourth sensor 106*d*. Fourth trigger device 320*d* may further be warned device 318**.

Fewer, different, and/or additional components may be incorporated into warning system 700. For example, second warning system 700 may include one or more sensors that define a boundary around vehicle 701. Vehicle 701 may be any type of vehicle. Fourth warning device **100*d* is similar to warning device 100 except it may not include first sensor 106*a* or second sensor 106*b***.

Fourth warning device **100*d*, fourth trigger device 320*d*, third sensor 106*c*, and fourth sensor 106*d* may communicate with each other through network 702 that may be similar to network 602. Network 702**, for example, may be a local or a personal area network commonly referred to as a WiFi network or a Bluetooth network.

For illustration of use of second warning system 700, each year accidents occur when vehicle 701, such as a milk truck, accesses an area such as a farm to transport goods such as milk. For example, vehicle 701 may be a large multiple axle trucks that is open under a body of a trailer. Even if a driver checks completely around vehicle 701 before starting vehicle 701, it is very easy for someone to fit under the body of vehicle 701 where they cannot be seen.

Second warning system 700 provides a solution to this problem. Second warning system 700 defines a boundary around vehicle 701 using, for example, third sensor **106*c* and fourth sensor 106*d* that define boundaries on either side of vehicle 701 using a first beam 704 from third sensor 106*c* and a second beam 706 from fourth sensor 106*d*. The beams 704, 706 define the sensing volume spanned by sensor 106. Third sensor 106*c* and fourth sensor 106*d* may detect anyone or anything that crosses first beam 704 or second beam 706 while the vehicle 701 is in motion. Second warning system 700 warns a driver of vehicle 701 when someone or something has crossed the boundaries when second warning system 700 is activated. The driver may use fourth trigger device 320*d* to activate/deactivate second warning system 700. Fourth warning device 100*d* is placed in a line of sight of the driver and may include warning sign 108, power source 110, light 112 that may flash when triggered, an audible horn, speaker 316, display 314**, etc.

Figure 8:
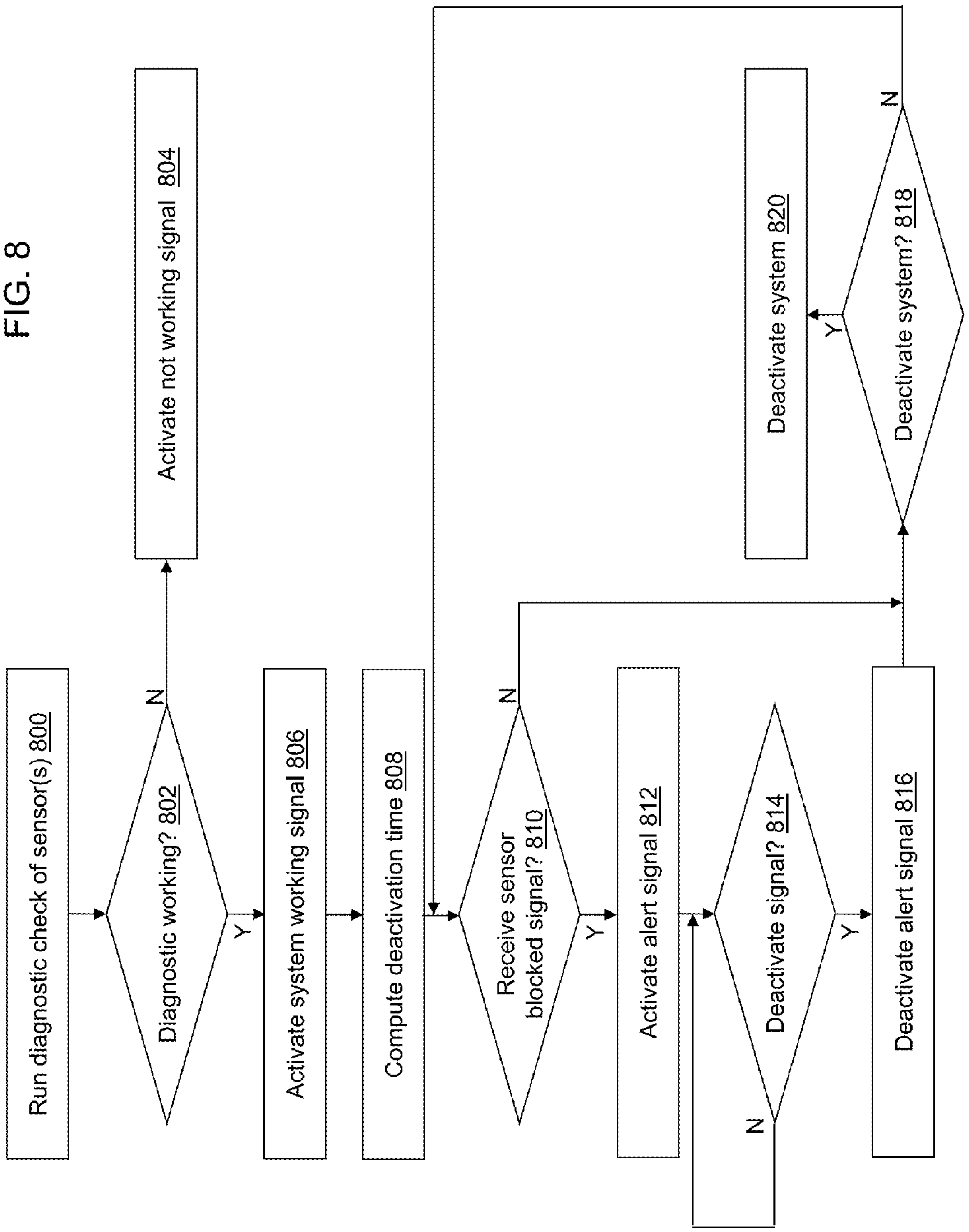
FIG. 8 depicts a flow diagram illustrating example operations performed by the warning system application of the controller of second warning system of FIG. 7 in accordance with another illustrative embodiment.

Referring to FIG. 8, additional example operations associated with warning system application 312 are described. Additional, fewer, or different operations may be performed depending on the embodiment. The order of presentation of the operations of FIG. 8 is not intended to be limiting.

For illustration, vehicle 701, such as a milk truck, drives into a warning area such as a farm to load/unload an item such as milk. The driver activates second warning system 700 using fourth trigger device **320*d* implemented as a remote control. In this illustrative embodiment, first beam 704 of third sensor 106*c* and second beam 706 of fourth sensor 106*d*** are positioned to protect a desired area adjacent an access to a milk house.

In an operation 800, after being activated by receiving a signal from fourth trigger device **320*d* through network 802, a diagnostic check is performed by warning system application 312. When not activated, warning system application 312 may be in a sleep state. When in the sleep state, blocking a boundary defined by the one or more sensors (e.g., third sensor 106*c* and fourth sensor 106*d*) of second warning system 700 does nothing. The diagnostic check may include confirming that the one or more sensors of second warning system 700** are operating properly and are not blocked.

In an operation 802, a determination is made concerning whether or not the diagnostic check indicated that second warning system 700 is operating properly. When second warning system 700 is operating properly, processing continues in an operation 806. When second warning system 700 is not operating properly, processing continues in an operation 804.

In operation 804, a not working signal may be activated to notify the driver that second warning system 700 is not operating properly. Second warning system 700 may then be deactivated until reactivated again.

In operation 806, a system working signal may be activated to notify the driver that second warning system 700 is operating properly. For example, a small light on fourth warning device **100*d* and/or fourth trigger device 320*d* may flash to inform the driver that second warning system 700** has been activated and is operating properly.

In an operation 808, a deactivation time may be computed for second warning system 700. For example, second warning system 700 may be triggered to remain on a predetermined period of time before shutting off.

In an operation 810, a determination is made concerning whether or not a signal is received from the one or more sensors (e.g., third sensor **106*c* and fourth sensor 106*d*) that indicates that the boundary defined by the one or more sensors has been crossed. When the signal is received, processing continues in an operation 812. When the signal is not received, processing continues in an operation 818**.

Similar to operation 410, in operation 812, the alert signal is activated to warn the driver that something has crossed or is blocking the boundary. For example, light 112 on fourth warning device **100*d* may be triggered to flash, the audible horn may sound, a noise may be played from speaker 316, a warning message may be presented in display 314, etc. warning the driver to immediately stop. Additionally, or in the alternative, fourth trigger device 320*d* may be triggered to flash, the audible horn may sound, a noise may be played from speaker 316, a warning message may be presented in display 314**, etc. warning the driver to immediately stop.

In an operation 814, a determination is made concerning whether or not a deactivate signal is received from fourth trigger device **320*d*. When the deactivate signal is received, processing continues in an operation 816. When the deactivate signal is not received, processing continues in operation 814, and the alert signal continues to be activated. A minimum warning time can be programmed and used in operation 814 to automatically indicate that the alert signal can be deactivated. Second warning system 700 can be deactivated by the driver using fourth trigger device 320***d* to send the deactivate signal when the item triggering the one or more sensors has been cleared.

Similar to operation 416, in operation 816, the alert signal is turned off. For example, light 112, display 314, speaker 316, and/or the audible horn of fourth warning device 100*d* and/or fourth trigger device 320*d* are turned off.

In operation 818, a determination is made concerning whether or not a deactivate system signal is received from fourth trigger device 320*d* or the deactivation time has been exceeded. When the deactivate system signal is received or the deactivation time has been exceeded, processing continues in an operation 820. When the deactivate system signal is not received and the deactivation time has not been exceeded, processing continues in operation 810 to continue to monitor whether or not anything crosses the boundary. For example, when the driver has moved the truck completely into position, the driver can use fourth trigger device 320*d* to send the deactivate system signal to avoid nuisance activations when vehicle 701 is no longer moving.

After the driver has completed the process of loading vehicle 701, they can activate second warning system 700 before walking around vehicle 701 to make sure that it is clear. Anything that crosses the boundary while second warning system 700 has been activated triggers the alert signal. The driver can now safely get back into vehicle 701 and move forward with the knowledge that nothing has crossed the boundary. Once the driver has successfully cleared the area, second warning system 700 can be deactivated using fourth trigger device 320*d* to send the deactivate system signal or second warning system 700 may automatically time-out in operation 818 based on the computed deactivation time.

In operation 820, second warning system 700 is deactivated. For example, second warning system 700 is switched to the sleep state.

As used in this disclosure, the term "mount" includes join, unite, connect, couple, associate, insert, hang, hold, affix, attach, fasten, bind, paste, secure, bolt, screw, rivet, solder, weld, glue, adhere, form over, layer, and other like terms. The phrases "mounted on" and "mounted to" include any interior or exterior portion of the element referenced. These phrases also encompass direct mounting (in which the referenced elements are in direct contact) and indirect mounting (in which the referenced elements are not in direct contact). Elements referenced as mounted to each other herein may further be integrally formed together, for example, using a molding process as understood by a person of skill in the art. As a result, elements described herein as being mounted to each other need not be discrete structural elements.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A non-transitory computer-readable medium having stored thereon computer-readable instructions that when executed by a computing device cause the computing device to:

receive a sensor measurement from a sensor to compute a speed of travel of a moving object passing the sensor;

compute a speed of travel of the moving object based on the received sensor measurement; and when the computed speed is below a predefined speed threshold, activate an alert signal of an alert signal device mounted adjacent to the sensor to alert an operator of a different moving object;

determine an alert activation time based on the computed speed, wherein the determined alert activation time increases as the computed speed decreases; and deactivate the alert signal when the determined alert activation time relative to a time of activation of the alert signal expires.

2. The non-transitory computer-readable medium of claim 1, wherein the sensor is a pair of photoelectric sensors.

3. The non-transitory computer-readable medium of claim 1, wherein the sensor is an infrared motion sensor.

4. The non-transitory computer-readable medium of claim 1, wherein the sensor is an ultrasonic sensor.

5. The non-transitory computer-readable medium of claim 1, wherein the predefined speed threshold is half a rated speed for a road on which the moving object is traveling.

6. The non-transitory computer-readable medium of claim 1, wherein the alert signal device includes a flashing light, and the alert signal includes a flashing light.

7. The non-transitory computer-readable medium of claim 1, wherein the moving object includes a vehicle.

8. The non-transitory computer-readable medium of claim 1, wherein the moving object includes a moving animal or a moving human.

9. The non-transitory computer-readable medium of claim 1, wherein the alert signal device is a display, and the alert signal includes a slow moving vehicle warning message.

10. A device comprising:

a sensor mounted to a post;

a processor; and a non-transitory computer-readable medium operably coupled to the processor, the computer-readable medium having computer-readable instructions stored thereon that, when executed by the processor, cause the processor to receive a sensor measurement from the sensor;

compute a speed of travel of a moving object passing the sensor based on the received sensor measurement; and when the computed speed is below a predefined speed threshold, activate an alert signal of an alert signal device mounted adjacent to the sensor to alert an operator of a different moving object; and deactivate the alert signal when a predetermined period of time relative to a time of activation of the alert signal expires.

11. The device of claim 10, wherein the alert signal device is mounted to the post.

12. The device of claim 10, wherein the processor and the non-transitory computer-readable medium are mounted to the post.

13. The device of claim 10, further comprising the alert signal device.

14. The device of claim 10, wherein the predefined speed threshold is half a rated speed for a road on which the moving object is traveling.

15. A method of identifying a slow moving object and activating an alert signal, the method comprising:

receiving, by a computing device, a sensor measurement from a sensor;

computing, by the computing device, a speed of travel of a moving object passing the sensor based on the received sensor measurement; and when the computed speed is below a predefined speed threshold, activating, by the computing device, an alert signal of an alert signal device mounted adjacent to the sensor to alert an operator of a different moving object; and deactivating, by the computing device, the alert signal when a predetermined period of time relative to a time of activation of the alert signal expires.

16. The method of claim 15, further comprising the alert signal device.

17. The method of claim 15, wherein the predefined speed threshold is half a rated speed for a road on which the moving object is traveling.

18. The method of claim 15, wherein the predefined speed threshold is half a rated speed for a road on which the moving object is traveling.

19. The method of claim 15, wherein the alert signal device is a display, and the alert signal includes a slow moving vehicle warning message.

20. The method of claim 15, wherein the moving object includes a moving animal or a moving human.

* * * * *